United States Patent [19]

Kipouras et al.

[11] Patent Number: 4,775,716

[45] Date of Patent: * Oct. 4, 1988

[54] ANTISTATIC THERMOPLASTIC COMPOSITION

[75] Inventors: George Kipouras, Newark, Calif.; Alan R. Federl, Parkersburg, W. Va.

[73] Assignee: Borg-Warner Chemicals, Inc., Parkersburg, W. Va.

[*] Notice: The portion of the term of this patent subsequent to May 13, 2003 has been disclaimed.

[21] Appl. No.: 862,085

[22] Filed: May 12, 1986

Related U.S. Application Data

[63] Continuation-in-part of Ser. No. 685,091, Dec. 21, 1984, Pat. No. 4,588,773.

[51] Int. Cl.$^4$ .................. C08L 71/00; C08L 71/02
[52] U.S. Cl. ..................................... 525/64; 525/66; 525/67; 525/487; 524/910
[58] Field of Search ................ 525/64, 66, 67; 524/910

[56] References Cited

U.S. PATENT DOCUMENTS

| | | | |
|---|---|---|---|
| 2,857,360 | 10/1958 | Feuer | 525/310 |
| 3,351,517 | 11/1967 | Willis | 161/184 |
| 3,445,544 | 5/1969 | Schmitt | 260/876 |
| 3,450,794 | 6/1969 | Ebneth et al. | 260/876 |
| 3,639,651 | 1/1972 | Komuro et al. | 260/23.7 M |
| 3,657,393 | 4/1972 | Komuro et al. | 260/887 |
| 3,674,893 | 7/1972 | Nowak et al. | 260/836 |
| 3,864,426 | 2/1975 | Salensky . | |
| 3,923,922 | 12/1975 | Grant | 260/2.5 EP |
| 4,048,261 | 9/1977 | Starmer | 260/888 |
| 4,315,081 | 2/1982 | Kobayashi et al. | 525/64 |
| 4,408,013 | 10/1983 | Barnhouse | 525/187 |
| 4,543,390 | 9/1985 | Tanaka et al. | 525/187 |
| 4,588,773 | 5/1986 | Federl et al. | 525/64 |

*Primary Examiner*—Carman J. Seccuro
*Attorney, Agent, or Firm*—Emily A. Richeson

[57] ABSTRACT

An antistatic thermoplastic composition is provided which comprises about 80% or more by weight of a thermoplastic resin component which includes an ABS graft copolymer; and about 20% or less by weight of an epihalohydrin copolymer of an epihalohydrin and an oxirane-containing comonomer, wherein the ratio by weight of said epihalohydrin to said comonomer is less than 13:7.

16 Claims, No Drawings

ANTISTATIC THERMOPLASTIC COMPOSITION

BACKGROUND OF THE INVENTION

This application is a continuation-in-part of application Ser. No. 685,091, filed Dec. 21, 1984, now U.S. Pat. No. 4,588,773.

The present invention relates generally to thermoplastic, ABS-containing compositions which exhibit antistatic properties. More specifically, the present invention relates to antistatic compositions which include ABS graft copolymers and an epihalohydrin rubber.

ABS graft copolymers have gained acceptance for a wide range of applications, such as computer housings, refrigerator linings and toys, due to their high impact strength, tensile strength and hardness combined with thermoplastic properties. However, most thermoplastic ABS compositions exhibit relatively slow electrostatic charge dissipation rates which make them unacceptable for many applications, such as certain medical devices and military equipment, wherein rapid dissipation of static electrical charge is required.

One method of reducing electrostatic charge retention is to coat the article, after molding, with materials which leave an antistatic film. While this may provide adequate antistatic properties temporarily, surface films tend to be worn off during use of the article, so that the film must be periodically reapplied or the antistatic properties are lost. This method also has the disadvantage of adding another step, e.g. coating, to the article manufacturing process, thereby increasing costs.

Another method of reducing static charge retention is that of incorporating a material with antistatic properties into the composition. One type of internal antistatic additive, such as ethoxylated amine chemicals, absorbs water from the air, thereby lowering the surface resistance of the composition. Unfortunately, however, this absorption process is reversed in dry environments, causing the antistatic property to diminish or be lost completely when the air surrounding the article is dry. These materials also tend to bloom to the surface of the article, where they are removed by wear.

Other additives used to reduce static charge retention are homopolymers and copolymers of ethylene oxide, such as epichlorohydrin rubber. Such polymers may be used as antistatic ingredients in plastics like polyvinyl chloride and other similar materials. U.S. Pat. No. 3,425,981 discloses a composition which includes an ethylene oxide homopolymer or copolymer in addition to an ethylene polymer resin. Suitable ethylene oxide copolymers contain ethylene oxide as the predominant monomer together with monomers having a single epoxy group, such as propylene oxide, butylene oxide and styrene oxide.

Certain antistatic compounds have also been added to ABS compositions in order to improve the electrostatic charge dissipation properties of the material. U.S. Pat. No. 3,450,794 to Ebneth, et al. discloses an antistatic thermoplastic composition which includes a graft copolymer of styrene and acrylonitrile on a conjugated diolefin, such as polybutadiene, a thermoplastic copolymer of a styrene and an acrylonitrile, blended with 1 to 10% by weight of a polypropylene glycol. This composition is reported as having a charge dissipation half life as low as 280 sec. However, this dissipation rate is not sufficient for many applications.

In summary, known means of imparting antistatic properties to plastics may have the disadvantages of diminishing with wear, leaching from the thermoplastic by water or other solvents, exhibiting inadequate charge dissipation rates or having dissipation rates which are dependent on the amount of moisture present in the surrounding atmosphere. However, due to the pervasive use of plastic materials, a great need exists for durable, highly conductive antistatic thermoplastic materials. This problem is particularly acute with ABS thermoplastics which are in great demand due to their favorable physical properties, yet are such efficient insulators that they may be used in some applications to support live electrical parts.

SUMMARY OF THE INVENTION

The present invention is an antistatic thermoplastic composition which comprises about 80% or more by weight of a thermoplastic resin component which includes an ABS graft copolymer, and about 20% or less by weight of an epihalohydrin copolymer of an epihalohydrin and an oxirane-containing comonomer, wherein the ratio by weight of epihalohydrin to oxirane comonomer is less than 13:7. It is preferred that the epihalohydrin copolymer be a copolymer of epichlorohydrin and an alkylene oxide, such as ethylene oxide, propylene oxide and mixtures thereof, and that the ratio by weight of epihalohydrin to oxirane comonomer in the epihalohydrin copolymer be about 1:19 to about 7:13.

DETAILED DESCRIPTION

The pesent invention is an antistatic thermoplastic composition which comprises about 80% or more by weight of a thermoplastic resin component which includes an ABS graft copolymer, and about 20% or less by weight of an epihalohydrin copolymer.

Although originally the term "ABS" denoted a copolymer primarily constructed from acrylonitrile, butadiene and styrene, this definition has been expanded in recent years to include copolymer resins in which these components have been replaced in whole or in part by closely analogous compounds.

The vinyl aromatic compound useful in the present invention may be any of a variety of copolymerizable vinyl aromatic compounds, such as alpha-methyl styrene, halogenated styrenes such as chlorostyrene and dibromostyrene, alkyl styrenes such as vinyl toluene, vinyl anilines and styrene. Mixtures of different vinyl aromatic compounds may also be used. It is preferred, however, that the vinyl aromatic compound be selected from the group consisting of styrene, halogenated styrenes, alpha-methyl styrenes, alkyl styrenes and mixtures thereof. In the embodiment which is most preferred, the graft copolymer includes at least some styrene.

The acrylonitrile compound useful in the present invention is any copolymerizable acrylonitrile compound, such as acrylonitrile, halogenated acrylonitriles, methacrylonitrile, ethacrylonitrile, further alkyl acrylonitrile derivatives, and mixtures thereof. In an embodiment which is less preferred, other non-nitrilated acrylic compounds, such as methacrylate, methyl methacrylate, ethylacrylate and acrolein, may be present in relatively small amounts. When non-nitrilated acrylic compounds are present, these should constitute less than 20% by weight, and preferably less than 10% by weight, of the ABS graft copolymer. Acrylonitrile and/or methacrylonitrile are preferred. Most preferably, at least some acrylonitrile is included, such as in ABS graft copolymers which contain acrylonitrile as the principle acrylic compound while including a lesser amount of methacrylonitrile.

The rubber substrate may be any of a variety of rubber substrates known in the art. However, preferred rubbers are those which include a diene rubber. Particularly preferred rubbers are polybutadiene rubbers and butadiene copolymer rubbers, such as copolymers of butadiene containing up to 35% of a copolymerizable monomer such as an acrylonitrile, an alkyl acrylate, an alkyl methacrylate or a vinyl aromatic monomer such as styrene. Alternatively, although less preferred than diene rubbers, other rubber substrates may be employed. Alternative materials include rubbers such as acrylic rubbers derived from alkyl acrylate homopolymer or copolymers, and normally including small amounts of di- or tri-functional crosslinking and graft linking monomers.

As is known in the art, the graft copolymers of the present invention may also include minor amounts of various additives to improve the properties of the resin. Such additives include crosslinking monomers such as divinyl benzene, ethylene glycol dimethacrylate and the like.

A great many of these graft copolymers are widely available commercially, or may be prepared according to any of a variety of known graft polymerization techniques. One such method involves copolymerizing the acrylonitrile monomer and the vinyl aromatic monomer is the presence of the previously formed rubber substrate. Typical methods for preparing traditional ABS graft polymers from styrene and acrylonitrile are found in U.S. Pat. No. 3,238,275. Also included in the invention as ABS graft copolymers are ABS-type resins prepared by blending a graft copolymer having a high rubber substrate content with a preformed rigid copolymer, such as a styrene-acrylonitrile copolymer (SAN), an acrylonitrile-alphamethylstyrene, styrene copolymer or the like.

The proportion of vinyl aromatic compound, acrylonitrile compound and rubber substrate will depend in part of the characteristics desired in the thermoplastic composition. It is preferred, however, that the ABS graft copolymer include at least 40% by weight of a combination of a vinyl aromatic and an acrylonitrile compound, and 60% or less by weight of a rubber substrate. More preferably, the ABS graft copolymer includes at least 50% by weight of a combination of a vinyl aromatic compound and an acrylonitrile compound, and 50% or less by weight of a rubber substrate.

Other thermoplastic polymers may be included in the thermoplastic resin component. The additional polymers may include styrenics such as high impact polystyrenes, halogenated polymers such as polyvinyl chlorides and polyvinylidene chlorides, polyesters such as polyethylene terephthalate and polybutylene terephthalates, polycarbonates, polyarylates, polyamides such as nylons, polyurethanes, rubbers, ionomers and rigid polymers of acrylonitrile. When polymers other than ABS are present in the resin component, these polymers preferably should constitute less than 60% by weight and more preferably less than 50% by weight of the thermoplastic resin component. As is known in the art, additives such as antioxidants, color stabilizers, fillers, dyes, flame retardants, plasticizers, lubricants, fibers, reinforcing aids, processing aids and pigments may also be included.

The antistatic thermoplastic composition of the present invention also includes about 20% or less by weight of a copolymer of an epihalohydrin copolymer and an oxirane-containing comonomer.

Epihalohydrin monomers may be generally described by the formula:

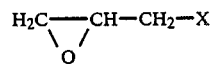

Wherein X is chlorine, bromine or iodine. Preferably, however, X is chlorine or bromine, with epichlorohydrin being most preferred.

The epihalohydrin may be copolymerized with any of a variety of other known, copolymerizable monomers which have an oxirane group. Such oxirane-containing comonomers include glycidyl ethers, monoepoxides of dienes and polyenes, glycidyl esters and alkylene oxides. Examples of such monomers include vinyl glycidyl ether, isopropenyl glycidyl ether, butadiene monoxide, chloroprene monoxide, 3,4-epoxy-1-pentene, glycidyl acrylate, glycidyl methacrylate, 1,2-epoxy-3,3,3-trichloropropane, phenyl glycidyl ether, ethylene oxide, propylene oxide and trichlorobutylene oxide.

Preferably, the oxirane monomer is an alkylene oxide such as ethylene oxide, propylene oxide, butylene oxide, 3,4-epoxy-pentene, 1,2-epoxy-3,3,3-trichloropropane, trichlorobutylene oxide and the like. More preferably, the alkylene oxide is ethylene oxide, propylene oxide or mixtures thereof. Ethylene oxide is most preferred.

Usually, the epihalohydrin and the alkylene oxide are copolymerized to form a epihalohydrin rubber prior to combination with the ABS graft copolymer. Suitable epihalohydrin copolymers may be prepared from known, commercially available monomers using known techniques, such as found in U.S. Pat. No. 3,135,705; 3,135,706; 3,508,923; 4,451,618 and 4,485,211.

Other, additional materials may be included in the epihalohydrin copolymer, such as amines, quaternary ammonium salts, conductive carbon black, lubricants, antioxidants and stabilizers.

It is critical to the invention that the epihalohydrin copolymer have a ratio by weight of epihalohydrin to polymerized oxirane comonomer which is less than 13:7. It is preferred, however, that the epihalohydrin copolymer have a ratio by weight of epihalohydrin to oxirane-containing monomer which is equal to or greater than 1:19. It is more preferred that the ratio by weight of epihalohydrin to oxirane comonomer in the epihalodrin copolymer be equal to 1:1 or less, and even more preferably equal to 7:13 or less. Epihalohydrin copolymers having a ratio by weight of epihalohydrin to oxirane comonomer of about 1:9 to about 3:7 are most preferred.

The composition of the present invention includes only about 20% by weight or less of the epihalohydrin, and about 80% by weight or more of the ABS-containing thermoplastic resin component, based on the combined weight of the epihalohydrin copolymer and the resin component. Preferably, the composition includes 80% by weight or more of the resin component and 20% by weight or less of the epihalohydrin copolymer. Compositions having more than 80% by weight of the resin component and less than 20% by weight of the epihalohydrin copolymer are more preferred.

Preferably, at least 2% by weight of the epihalohydrin copolymer and 98% by weight or less of the ABS-containing resin component is included. Compositions containing 5% or more by weight of the epihalohydrin copolymer and 95% or less ABS-containing resin component are more preferred. Compositions having 90% or less by weight ABS-containing resin component and 10% or more by weight epihalohydrin copolymer are most preferred, with compositions where the epihalohydrin copolymer has an epihalohydrin:oxirane monomer ratio by weight of about 25:75 often giving good results at epihalohydrin copolymer loading levels of about 15% to about 19% by weight of the antistatic thermoplastic composition.

The thermoplastic ABS-containing resin component and the epihalohydrin rubber may be combined by any of a variety of known techniques, such as mixing in a Banbury mixer, melt blending, extrusion and milling. A small amount of crosslinking agent, such as dicumylperoxide, may be included, although crosslinking agents may not be necessary to obtain a suitable composition. Other known additives, such as impact modifiers, pigments, lubricants, stabilizers, fillers and antioxidants, may also be included, and may be incorporated into the epihalohydrin copolymer and/or ABS-containing resin component separately, or during or after the epihalohydrin copolymer and the resin component have been blended together.

SPECIFIC EMBODIMENTS

The following Examples relate to testing of blends of various proportions of an epihalohydrin rubber and an ABS graft copolymer according to Federal Test Method Standard 101, Method 4046. This method involves applying an electrical charge to a sample and measuring the decay rate of the sample's charge.

The ABS material considered in Examples 1 (A-D)–3 (A-D) is a 31/13/56 A/B/S graft copolymer. This material is prepared using known emulsion polymerization and grafting techniques. Blends of ABS and epihalohydrin copolymer also contain up to 4% lubricating and stabilizing additives.

Samples are Banbury mixed and milled, then injection molded at an elevated temperature to dimensions of 125 mils. thick, 3.5 inches wide and 5 inches long. Samples are then conditioned at 73° F. for 24 hours at 13% relative humidity (RH). Samples are then tested according to Method 4046 using a static decay meter. This device applies a 5000 volt charge to the sample and then monitors the time the sample takes to dissipate this charge down to zero volts.

The epichlorohydrin copolymer of Examples 1 (A-D) is a 65/35 by weight epichlorohydrin/ethylene oxide copolymer, while the epichlorohydrin copolymer of Examples 2 (A-D) and 3 (A-D) is a copolymer of approximately 25 parts by weight epichlorohydrin and approximately 75 parts by weight ethylene oxide.

The compositions of Examples 1A-D do not embody the invention, while the compositions of Examples 2 (A-D)–3 (A-D) are consistent with several embodiments of the invention. The results of testing are indicated below in Table I.

Table II represents data regarding the physical properties of the composition of comparative Examples 1 (A-D) and the compositions of Examples 2 (A-D)–3 (A-D) which are consistent with various embodiments of the invention. Testing referenced in Table II is according to ASTM procedures, with the letters "RT" indicating room temperature (e.g. approximately 25° C.). The samples for testing specific gravity were compression molded. These samples for the other tests represented in Table II were injection molded.

ASTM tests used were as follows:
Izod Impact—ASTM D256
Tensile Strength—ASTM D638
Flexural Strength—ASTM D790
Specific Gravity—ASTM D792 Method A
Heat Distortion Temperature (HDT)—ASTM D648

As a comparison of data from Examples 1 (A-D) with data from Examples 2 (A-D)–3 (A-D) indicates, samples embodying the present invention may have substantially faster charge dissipation rates at lower amounts of eipchlorohydrin copolymer than other analogous ABS graft copolymer/epihalohydrin copolymer blends which do not embody the invention, thereby making the compositions of the present invention suitable for many uses wherein other compositions may be less well adapted. For example, military specification MIL-B-81705B requires that the charge decay rate from 5000 volts to zero volts be less than 2.0 seconds. As is apparent from the above data, compositions of the present invention may meet this criterion while maintaining good physical properties.

These examples have been presented only to demonstrate operability and certain aspects of the present invention. The scope of the present invention is not limited to these above embodiments, but includes equivalent embodiments and modifications as defined by the following claims.

TABLE I

CHARGE DISSIPATION FROM 5000 INITIAL VOLTS

| EXAMPLE | % EPCH | % ABS | TIME TO ZERO VOLTS (sec) |
|---|---|---|---|
| 1A | 5 | 95 | >60 |
| 1B | 10 | 90 | >60 |
| 1C | 15 | 85 | 13.8* |
| 1D | 20 | 80 | 4.5* |
| 2A | 5 | 95 | >60 |
| 2B | 10 | 90 | 4.5* |
| 2C | 15 | 85 | 1.9* |
| 2D | 20 | 80 | 0.3* |
| 3A | 5 | 95 | >60 |
| 3B | 10 | 90 | 4.3* |
| 3C | 15 | 85 | 0.7* |
| 3D | 20 | 80 | 0.2* |

*Reported value was obtained by averaging the results of three runs.

TABLE II

PHYSICAL PROPERTIES

| ASTM Test | 1A | 1B | 1C | 1D | 2A | 2B | 2C | 2D | 3A | 3B | 3C | 3D |
|---|---|---|---|---|---|---|---|---|---|---|---|---|
| IZOD IMPACT (FT-LBS/INCH), RT | 7.1 | 8 | 5.5 | 2.9 | 8.2 | 5.6 | 4.1 | 3 | 8.4 | 3.7 | 2.8 | 2.1 |
| TENSILE STRENGTH (PSI), RT | 6590 | 5785 | 5135 | 4620 | 6455 | 5555 | 4890 | 4100 | 6690 | 5850 | 5100 | 4315 |
| TENSILE MODULUS | 3.57 | 3.12 | 3.15 | 2.76 | 3.57 | 3.2 | 3.2 | 2.74 | 3.7 | 3.28 | 2.71 | 2.78 |

TABLE II-continued

| ASTM Test | 1A | 1B | 1C | 1D | 2A | 2B | 2C | 2D | 3A | 3B | 3C | 3D |
|---|---|---|---|---|---|---|---|---|---|---|---|---|
| PHYSICAL PROPERTIES — Example # | | | | | | | | | | | | |
| FLEXURAL STRENGTH (PSI), RT | 10775 | 9480 | 8425 | 7320 | 10180 | 8725 | 7820 | 6430 | 10405 | 8910 | 7635 | 6360 |
| FLEXURAL MODULUS (PSI × 10$^5$), RT | 3.7 | 3.4 | 3.3 | 2.9 | 3.7 | 3.4 | 3.2 | 2.9 | 3.5 | 3.4 | 3.2 | 2.8 |
| SPECIFIC GRAVITY | 1.07 | 1.08 | 1.08 | 1.09 | 1.06 | 1.07 | 1.07 | 1.08 | 1.06 | 1.07 | 1.07 | 1.08 |
| HDT(⅛ × ½ CM) 264 PSI UNANNEALED-°F. | 171 | 176 | 181 | 176 | 180 | 176 | 178 | 177 | 182 | 181 | 182 | 174 |

We claim:

1. An antistatic thermoplastic composition comprising:
    (A) 80% or more by weight of a copolymer having a rubber substrate and a rigid phase, said rigid phase including an acrylonitrile and a vinyl aromatic compound and being substantially free of non-nitrilated acrylic compounds; and
    (B) 20% or less by weight of an epihalohydrin copolymer of an epihalohydrin and an oxirane-containing comonomer, wherein the ratio by weight of said epihalohydrin to said oxirane comonomer is equal to or less than 1:1;
  wherein said epihalohydrin copolymer is present in an amount such that said antistatic thermoplastic composition has improved antistatic properties in comparison to said antistatic thermoplastic composition wherein said epihalohydrin copolymer is absent.

2. The composition of claim 1 wherein said copolymer of claim 1(A) consists essentially of an ABS graft copolymer.

3. The composition of claim 1 wherein the copolymer of claim 1(A) includes at least 40% by weight of a combination of a vinyl aromatic compound and an acrylonitrile compound, and up to 60% by weight of a rubber substrate.

4. The composition of claim 1 wherein the ABS graft copolymer includes an acrylonitrile compound selected from the group consisting of acrylonitrile, methacrylonitrile, and mixtures thereof.

5. The composition of claim 4 wherein the ABS graft copolymer includes a vinyl aromatic compound selected from the group consisting of styrene, halogenated styrenes, alpha-methyl styrenes, alkyl styrenes and mixtures thereof.

6. The composition of claim 5 wherein the rubber substrate of claim 1(A) includes a diene rubber.

7. The composition of claim 1 wherein the ratio by weight of epihalohydrin to oxirane comonomer in said epihalohydrin copolymer is at least 1:19.

8. The composition of claim 7 wherein said ratio by weight of epihalohydrin to oxirane comonomer is equal to or less than 7:13.

9. The composition of claim 8 wherein said ratio by weight of epihalohydrin to oxirane comonomer is about 1:9 to about 3:7.

10. The composition of claim 7 wherein the epihalohydrin is copolymerized with an alkylene oxide.

11. The composition of claim 10 wherein the alkylene oxide is selected from the group consisting of ethylene oxide, propylene oxide and mixtures thereof.

12. The composition of claim 7 wherein the epihalohydrin is epichlorohydrin.

13. The composition of claim 1 wherein component 1(A) is present in an amount equal to or less than 98% by weight, and said epihalohydrin copolymer is present in an amount equal to or more than 2% by weight.

14. The composition of claim 13 wherein component 1(A) is present in an amount equal to or less than 95% by weight, and said epihalohydrin copolymer is present in an amount equal to or more than 5% by weight.

15. The composition of claim 14 wherein component 1(A) is present in an amount equal to or less than 90% by weight and said epihalohydrin copolymer is present in an amount equal to or more than 10% by weight.

16. The composition of claim 1 wherein said composition includes at least one polymer selected from the group consisting of high impact polystyrenes, polyvinyl chlorides, polyvinylidene chlorides, polyesters, polycarbonates, polyarylates, polyamides, and polyurethanes.

* * * * *

Adverse Decisions In Interference

Patent No. 4,775,716, George Kipouras, Alan R. Federl, ANTISTATIC THERMOPLASTIC COMPOSITION, Interference No. 103,029, final judgment adverse to the patentees rendered March 9, 2000, as to claims 1-16.